United States Patent

[11] 3,594,624

[72] Inventor Ernst Lueder
Stuttgart sur, Germany
[21] Appl. No. 615,517
[22] Filed Feb. 13, 1967
[45] Patented July 20, 1971
[73] Assignee Firma Gebr. Buhler Nachfolger G.m.b.H.
Kornerstrasse, Nurnberg, Germany
[32] Priority Feb. 15, 1966
[33] Germany
[31] L52862

[54] ELECTRICAL MOTOR CONTROLS INCLUDING NON-LINEAR SERIES RESONANT CIRCUITS
1 Claim, 9 Drawing Figs.
[52] U.S. Cl.................................................. 318/254,
331/65, 313/439
[51] Int. Cl.................................................. H02k 29/00
[50] Field of Search........................................ 331/65, 77;
340/75; 318/130, 133, 138, 259, 59, 439

[56] References Cited
UNITED STATES PATENTS
2,980,839   4/1961   Haeussermann........... 318/254 X
3,214,663  10/1965   Kreutzer..................... 318/138
3,239,739   3/1966   Scholl........................ 318/138
3,373,327   3/1968   Teuber....................... 318/138
3,381,192   4/1968   Neville et al................ 318/138
2,040,763   5/1936   Summers.................... 318/133 X
2,048,723   7/1936   Appleton.................... 331/77 X
2,146,769   2/1939   Schriever et al............. 331/75
2,150,440   3/1939   Hargreaves................. 331/75
2,205,424   6/1940   Leonard..................... 331/75 X
2,325,927   8/1943   Wilbur....................... 331/65 X
2,992,397   7/1961   Roberts..................... 331/75 X Primary Examiner—G. R. Simmons
Attorney—Arthur O. Klein ABSTRACT: Electrical controls which include a resonance circuit connected electrically to an oscillator and having a plurality of circuit elements to one of which an output means is connected in parallel. A regulating means coacts with one of the circuit elements for influencing at least one of the parameters of the circuit. For example, the circuit may include an inductance coil and the regulating means may take the form of a permanent magnet which is moved in a predetermined manner with respect to the inductance coil so as to achieve in this way the controls of the invention. The output means is connected through a transistor, for example, to an element such as a stationary coil section of a commutator-less direct current motor, or the structure may act as a switch for controlling a circuit, so that in this way the structure will form an incorporeal switch.

INVENTOR:
ERNST LÜDER

INVENTOR:
ERNST LÜDER

BY:
Arthur O. Klein
ATTORNEY

ELECTRICAL MOTOR CONTROLS INCLUDING NONLINEAR SERIES RESONANT CIRCUITS

The invention relates to electrical controls for various purposes, such as, for example, for the purpose of controlling a commutatorless direct current motor.

The invention is characterized by an electrical resonance circuit which is connected to an oscillator and which has a regulating means, in the form of at least one control element, which influences at least one parameter of the circuit. The control output is connected in parallel with one of the elements of the resonance circuit.

In order to control commutatorless direct current motors, there are already known control elements in the form of movable permanent magnets which change the ohmic resistance of so-called field plates depending upon the magnetic field. In this way the change in resistance which is brought about by the control elements produces a change in potential which may be used, for example, to actuate a transistor. Moreover, commutatorless direct current motors are provided with control elements in the form of movable coils which, according to the angular position of the rotor, are situated within or without a magnetic stray field and thus will have or will not have an induced potential at their terminals. This induced potential is used to control the current in a winding of the motor. It has also become known that a transformer, which has been strongly premagnetized by a magnetic field, will, because of its saturation, be incapable of producing any secondary potential. This secondary potential increases, however, when the premagnetizing is eliminated. Thus, this secondary potential which is dependent upon the premagnetizing lends itself to control.

The range of uses of known structures of the above type is limited on the one hand because the extent to which changes in potential can be achieved is relatively small and on the other hand because the control potential always increases gradually, and not in a sudden jump, from a small amplitude into a large amplitude.

It is a primary object of the present invention to provide electrical controls which will go beyond the limits of the known controls and which will provide many more uses for the controls.

Thus, it is an object of the invention to provide controls which are not only capable of achieving a change in value of an electrical control element but also controls which are capable of influencing an entire resonance circuit.

Thus, it is an object of the invention to provide by way of the controls of the invention much greater potential changes than could heretofore be achieved at the outputs of the known structures. With the invention it is possible to achieve the advantage of providing for the controlled elements relatively large potential tolerances with respect to their throughput potential, their reversing potential, or other increasing values.

It is furthermore an object of the invention to provide a construction which is capable of producing, in a manner described below in greater detail, a sudden, sharp, almost instantaneous change in the control potential from a condition of small amplitude into a condition of large amplitude, so that the controls operate to produce results similar to those achieved by the sudden opening and closing of a corporeal switch, the structure of the invention thus providing an incorporeal switch which although there are no actual contacts engaging and disengaging each other, nevertheless will produce similar results.

The range of uses which may be made for the structure of the invention is very broad, since it permits many different types of control elements to be used and can bring about a reversing action by a change in the inductance, the capacitance, or the ohmic resistance, as well as in the amplitude of the input potential of an oscillator, or the invention can be used to regulate the frequency of such an oscillator. In this way it is possible to have linear or nonlinear, parallel or series oscillatory circuits.

A preferred form of the invention includes a nonlinear resonance circuit having at least one inductance and one capacitance forming at least part of an oscillatory series circuit, particularly a ferroresonance circuit.

The parameters which are to be influenced, as by the movement of at least one permanent magnet with respect to an impedance of the resonance circuit, can be the current which flows through a secondary coil of the impedance in the resonance circuit or the direct potential of a Varactor diode. In this way the Varactor diode changes its capacitance depending upon the direct potential at its terminals. The parameters which can be controlled with the invention are also elements such as an ohmic resistance connected in series with the inductance and capacitance and whose resistance can, for example, depend upon the magnetic induction, the applied potential, the current, or the amount of light which is received. It is also possible to bring about reversals by means of control elements which are known in themselves and which are capable of influencing the output potential and/or the frequency of the oscillator. Beside controlling a commutatorless direct current motor, the electrical controls of the invention can also be used with such structures as an electronic ignition installation for automobiles, for the control of washing machines, for the control of bookkeeping or accounting machines, as well as other machines where controlled contacts are required. Thus, the invention is capable of being used at any location where an incorporeal contact arrangement is required.

The invention is illustrated by way of example in the accompanying drawings which form part of this application and in which:

FIG. 1 illustrates a nonlinear oscillatory series circuit;

FIGS. 2 and 3 respectively illustrate characteristic curves of a nonlinear oscillatory series circuit;

Figure 1:
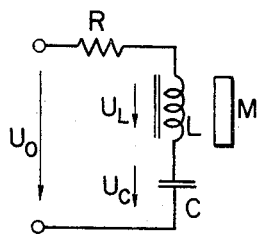
Figure 2:
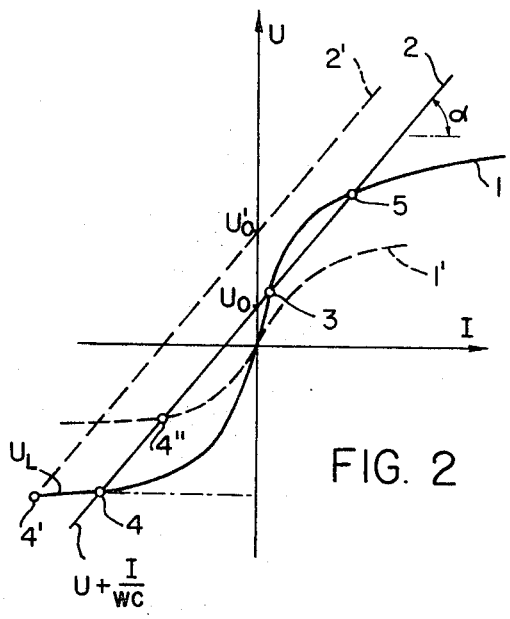
Figure 3:
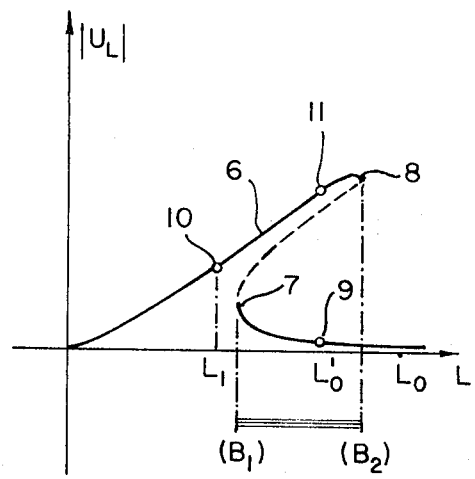

FIGS. 2 and 3 show characteristic curves for an oscillatory series circuit having the construction shown in FIG. 1. This circuit includes a relatively small ohmic resistor R, an inductance L and a capacitance C, and at least one parameter of this circuit is capable of being influenced by a regulating means of the invention. In the illustrated example the condition of the circuit is capable changed by the influence of a permanent magnet M on the inductance L.

In the current/voltage diagram of FIG. 2, the curve 1 for the potential $U_L(I)$ applied at the nonlinear impedance L is illustrated. Also a linear curve 2 is provided, this curve illustrating the potential $[U_o+(1/WC)]$ depending upon the current. The potential equation for the oscillatory series circuit, in the event that the circuit is inductive and the ohmic resistance R is neglected, is $$U_o = U_L(I) - U_C$$

so that $$U_L(I) = U_o + I(1/WC).$$

The points 3, 4 and 5, at which the two voltage curves intersect each other, are possible operating points of the oscillatory circuit where the intersection points 3 and 4 illustrate stable operating points and the intersection point 5 indicates an unstable operating point, as is known from the theory of nonlinear resonance circuits.

In FIG. 3 is illustrated the magnitude of the impedance potential $U_L$ in dependence upon the inductance L of the impedance in a nonlinear damped oscillatory circuit. The curve 6 is also known from the theory of nonlinear oscillatory circuits. The part of the curve 6 which is shown as a solid line indicates the stable region thereof, while that part of the curve 6 which is shown as a dotted line is an unstable region.

From both of these diagrams of FIGS. 2 and 3 it is possible to explain the operation of the structure of the invention. Assuming that the oscillatory circuit is at the stable operating point 3, shown in FIG. 2, then it is possible, for example, by raising the potential $U_o$ which is supplied to the oscillatory circuit, to bring about the shifting of the linear curve 2 into the dotted line position 2', so that the oscillatory circuit is brought into a condition where it has only one stable operating point 4'. The oscillatory circuit reverses, therefore, at the operating point 4'. This operating point has a higher current I than the operating point 3. It is therefore possible to derive from a parallel connection with any element of the oscillatory circuit a larger potential with which electrically interconnected electronic switching steps or the like can be controlled.

A reversal of the oscillatory circuit in another stable location with a different current value can also be brought about by changing the capacitance C or the frequency W of the applied potential $U_o$ so that a change of the slope $\alpha$ of the linear curve 2 can be achieved. It is preferred however, to bring about the reversal of the resonance circuit by way of a change of the inductance L of the oscillatory circuit, for example, by means of a permanent magnet or by means of the current in a secondary coil on the core of an impedance which is used as the inductance. By premagnetizing the impedance, the curve 1 can be influenced, and it is possible in this way to achieve a curve 1' which will permit the resonance circuit to have only a single stable condition. During a change of the curve 1', into the curve 1', the oscillatory circuit shifts from the stable operating point 3 into the operating 4'' where a higher current flows than at the operating point 3.

The maintenance of the impedance under the influence of the change of the magnetic circulation is illustrated in FIG. 3. The impedance initially has an inductance $L_o$ and is thus in a condition where a small current I flows, corresponding to the operating point 3 of FIG. 2. By means of a permanent magnet M, which is applied to the impedance L, the inductance of the impedance can be reduced, for example, up to a value $L_1$ (FIG. 3). As a result the nonlinear oscillatory circuit reverses about the point 7 of the curve 6 into the upper branch of the curve with a higher current and a higher voltage. This reversal corresponds to shifting the resonance circuit from the point 3 to the operating point 4 or 4'' in FIG. 2. When the premagnetizing is removed, then the original inductance $L_o$ will again prevail, and the circuit reversed about the point 8 again into the condition of lesser current. This reversal about the points 7 and 8 can take place very quickly.

As is apparent from the curve 6 of FIG. 3, a device constructed according to the invention can be adjusted in such a way that during a lowering of the inductance of the impedance from the value $L'_o$ (operating point 9 in FIG. 3) to the value $L_1$ (operating point 10 in FIG. 3), a reversal of the resonance circuit about the point 7 is achieved, while at the same time a return of the resonance circuit after removal of the magnet is retained. When the premagnetizing is removed, the value $L'_o$ is again achieved, but now the circuit is at the operating point 11 and a return into the original condition about the point 8 is not possible. This situation is encountered when the inductance L of the saturated impedance is situated in the range between the points 7 and 8 of the curve, through the range limited by the induction values $B_1$ and $B_2$, for example at a value $L'_o$.

Thus, controls constructed in accordance with the invention and having the form of a nonlinear resonance circuit have an extremely wide range of uses.

Figures 4, 5:
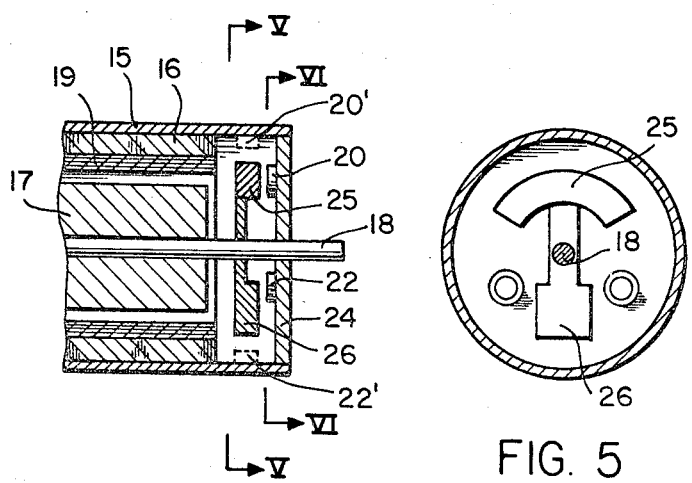
FIG. 4 is a fragmentary schematic representation showing in an axial sectional view the construction of a commutatorless direct current motor according to the invention.
FIG. 5 is a transverse section of the structure of FIG. 4 taken along line V-V of FIG. 4 in the direction of the direction of the arrows.

FIGS. 4—7 illustrate a practical embodiment of the structure of the invention, where the above-described reversals and shifting of a nonlinear resonance circuit by means of a change in the inductance of the resonance circuit is used. FIG. 4 shows in a schematic fragmentary view a commutatorless direct current motor which includes a hollow cylindrical housing 15 at whose inner surface a laminated, cylindrically shaped iron body 16 is arranged, this body 16 forming the magnetic return flow path for a homogeneous permanent magnet rotor 17 which is fixed on the motor shaft 18. The armature winding 19 of the motor is stationary and is, for example, fixed directly to the grooved return flow body 16. The armature winding is, as is apparent from the wiring diagram of FIG. 7, divided into three equal winding sections 19a, 19b, 19c, which in a manner similar to a three-phase winding are uniformly distributed along the circumference of the motor. In order to drive the motor the individual winding sections must be controlled by means of a special control circuit, so that the direct driving current of the motor flows in a predetermined sequence through the individual winding sections so as to achieve a turning moment which acts on the rotor.

Figure 6:
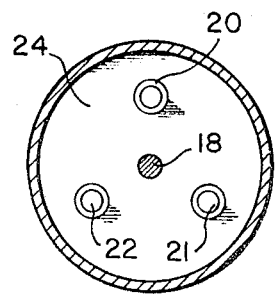
FIG. 6 is a transverse section of the structure of FIG. 4 taken along line VI-VI of FIG. 4 in the direction of the arrow.

In accordance with the invention the control circuit for each of the three winding sections includes a nonlinear oscillatory series circuit having an impedance 20, 21 and 22. As is shown in FIGS. 4 and 6, these impedance are displaced with respect to each other by 120° at the inner surface of the stationary bearing plate 24 and are situated within the operating range of an arcuate magnet 25 which is fixed the motor shaft 18 for rotation therewith and thus rotates together with the rotor 17. In order to avoid unbalance, the magnet 25 has connected thereto a counterbalance weight 26. The three impedances can, of course, also be displaced with respect to each other by 120° and arranged at the inner surface of the housing 15 by being fixed to the latter in any suitable way, and the impedances 20', 22' are shown in this position schematically in FIG. 4. By means of the magnet 25, the inductance of the impedances 20—22 is changed in the above-described manner. The size and arrangement of the magnet 25 are such that at any angular position of the rotor one of the impedances 20—22 is reliably influenced by the permanent magnet.

Figure 7:
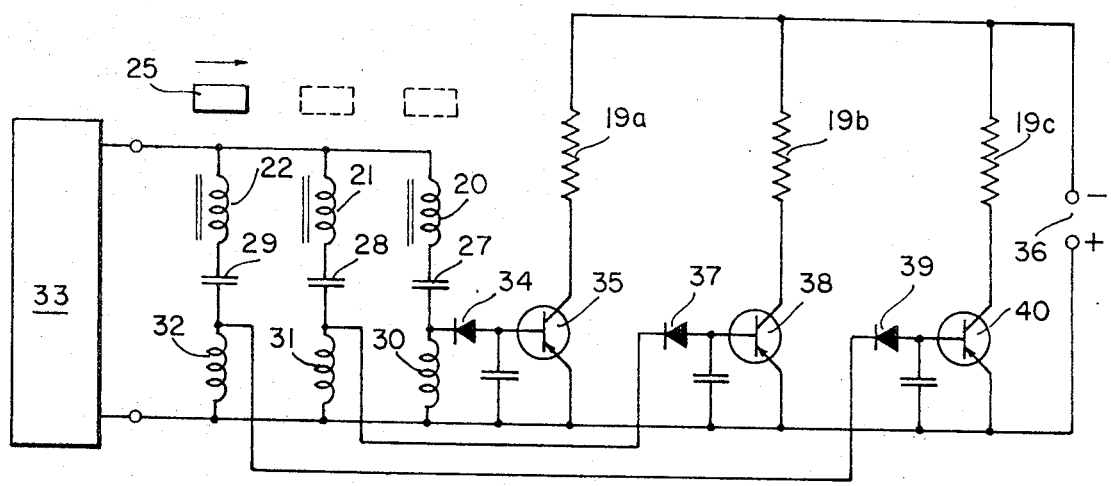
FIG. 7 is a wiring diagram of the controls for a commutatorless direct current motor of the invention.

As may be seen from FIG. 7, the three oscillatory series circuits, which include in addition to the impedances 20, 21, 22 also capacitors 27, 28, 29 and potential takeoff coils 30, 31, 32, are connected in parallel to an oscillator 33. At the location of the coils 30, 31, 32 it is also possible to provide ohmic resistors or capacitors. The output potential taken off from the coil 33 of the first resonance oscillatory circuit, forming one of the output means shown in FIG. 7, is delivered by way of a diode 34 to the base of a power transistor means 35, whose emitter/collector circuit is connected, in series with the first armature winding section 19a, to the direct potential driving source 36 for the commutatorless direct current motor. The output means which is connected in parallel with the coil 31 of the second resonance circuit and the output means which is connected in parallel with the coil 32 of the ferric resonance circuit provide, respectively, output potentials which is a corresponding manner are delivered through the diodes 37 and 39 to the pair of power transistor means 38 and 40 whose emitter/collector circuits are respectively connected, in series with the winding sections 19b and 19c of the motor, to the direct potential source 36.

All three resonance circuits are situated at the operating point 3 shown in FIG. 2 so that they are normally in a condition of low current I which flows through each of the resonance circuits. As soon as the permanent magnet 25 which rotates with the rotor of the motor arrives at the region of one of the saturated impedances 20—22 of one of the three resonance circuits, for example as shown in FIG. 7 in the region of the impedance 22, the inductance of this impedance 22 lessens lessens its normal value $L_o$ shown in FIG. 3 to the inductance $L_1$. As a result there is a reversal of the curve 6 about the point 7 to the operating point 10 at the region of higher current. There thus takes place also a shifting of the oscillatory circuit from the operating point 3 for example to the operating point 4". The result is an increase in the potential also at the coil 32 of the oscillatory circuit, which is taken off as the output potential and delivered through the diode 39 to the base of the power transistor 40.

The circuit is arranged in such a way that as a result the base potential of the power transformer is reduced to such an extent that it becomes permeable and through the emitter/collector circuit of the power transistor means 40 a direct current flows from the potential source 36 through the winding section 19c of the direct current motor. As soon as the permanent magnet 25, which rotates with the rotor, moves beyond the region of the impedance 22, the oscillatory circuit returns to its initial stable operating point 3, the power transistor 40 is blocked and the flow of direct current through the winding section 19c is interrupted. At this instant, however, because of the size of the permanent magnet 25, the next-following ferrite core impedance 21 of the second resonance circuit is already influenced by the permanent magnet, and this resonance circuit shifts into its other operating point in the region of greater current, so that the power transistor means 38, by a reduction in its base potential, becomes permeable and now a flow of direct current through the winding section 19b takes place.

These control and switching operations then take place at the third resonance circuit and from the latter will subsequently be repeated at the first resonance circuit, so that in a continuous manner these operations are sequentially repeated at the successive resonance circuits. Through the successive energizing of the three winding sections 19a—19c, there will be provided in the direct current motor, in a known manner, a rotary magnetic field controlled by the rotor and exerting a turning moment on the rotor.

The above-described controls can be changed in different ways. For example, by providing a symmetrical or nonsymmetrical arrangement of a plurality of rotary permanent magnets 25, the individual windings 19a—19c can be simultaneously connected to or disconnected from the source of direct potential 36. Also, it is not essential that the power transistors 35, 38 and 40 be actuated directly by the output potential of the resonance circuits, and instead the plurality of power transistor means can be provided with prestages, for example with collector-base stages (so-called emitter connections), by means of which the output potential of the resonance circuits are controlled.

Figure 8:
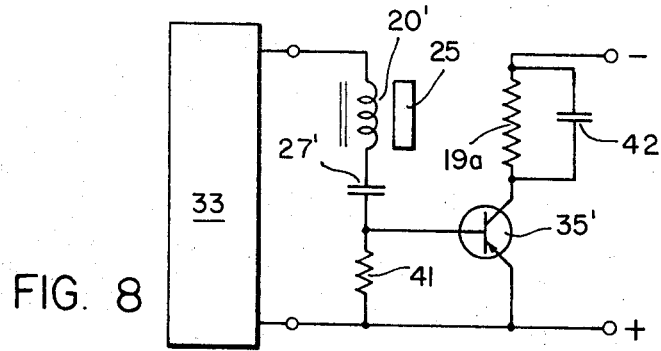
FIG. 8 shows a part of another embodiment of a wiring diagram for a commutatorless direct current motor corresponding in general to that of FIG. 7.
Figure 9:
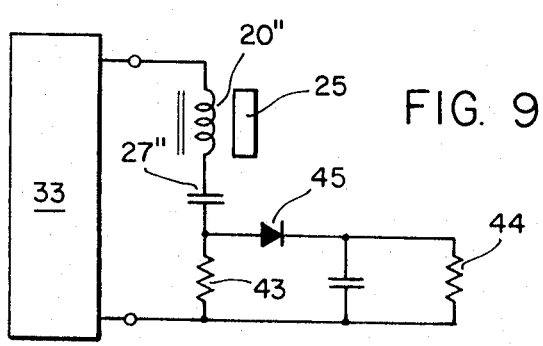
FIG. 9 is a fragmentary illustration of yet another embodiment of a wiring diagram for a commutatorless direct current motor corresponding in general to that of FIG. 7.

FIGS. 8 and 9 show two additional possible changes in the circuits which can be considered in connection with FIG. 7. For the sake of simplicity only one of the three resonance circuits is shown in each of FIGS. 8 and 9. According to the circuit of FIG. 8, the potential taken off by the output means which is connected in parallel with the ohmic resistor 41, this potential being a control potential derived from the nonlinear resonance circuit which includes the impedance 20' and the capacitor 27', undergoes a rectification directly through the emitter-base diode of the power transistor means 35'. In this way a pulsating collector current is achieved through the illustrated winding section 19a of the direct current motor, and if necessary this pulsating current can be smoothed by means of a capacitor 42.

With the circuit illustrated in FIG. 9, the resonance circuit includes the impedance 20", the capacitor 27", and an ohmic resistor 43, and this resonance circuit has its power delivered to a power-consuming means 44 (for example a winding section of a commutatorless direct current motor) through the output means which is connected in parallel with the resistor 43 and which includes the rectifier 45 so that the power is derived directly from the nonlinear resonance circuit. Thus, the nonlinear resonance circuit takes over simultaneously the function of controls and power output. Without the rectifying element 45, it is possible to provide in the power-consuming unit 44 an alternating current. The upper limit of the power which is available to the consuming means 44, is determined by the maximum damping, of the nonlinear circuit, above which the circuit will no longer have a pair of stable conditions.

The control connections can also be formed by means of linear resonance circuits. With a small inductance control, where linear relationships prevail, by reason of the nonlinearity of the magnetizing curve it is also possible to achieve with a nonsaturated impedance a change in the potential $U_L$, by means of a permanent magnet, which is sufficient, for example, to control a transistor. The sharply pronounced sudden changes which are achieved with a nonlinear resonance circuit, however, assure a reliable operation of the device of the invention with the advantages referred to above.

As has already been mentioned, the use of the invention is not limited to the above-described examples, and instead the invention relates to a practically incorporeal contact arrangement which can be used in the most widely different control installations, and, in addition, the controls can be brought about not only by a change in the inductance of the resonance circuit, but also by changing its capacitance (for example by using a Varactor diode), by changing the potential of the frequency of the oscillator, and —with suitable dimensions — even by way of a change in the ohmic resistance of the resonance circuit. Thus, the control elements, such as the permanent magnet, can be connected to the most widely different types of carriers, such as for example, rotary shafts or linearly shiftable machine components. HOwever, they can also be fixedly coupled to elements of the resonance circuit, as, for example, in the case of a control winding at the impedance or at the simultaneous use of a Varactor diode as the capacitor of a resonance circuit. In order to additionally influence the output potential taken off at the resonance circuit, resistors which are dependent upon current or voltage can be provided in the resonance circuit.

I claim:

1. In a rotary electrical machine having a rotor and N stator windings, a high speed contactless commutator for energizing the stator windings in sequence from a source of direct potential, which comprises:

N normally disabled gates individually connected between the stator windings and the potential source;

N nonlinear series resonant circuits each including a saturable core reactor, a capacitor, and a noncapacitive impedance;

an oscillator;

means for connecting the oscillator in parallel with each of the series circuits;

means individually coupling the voltage across the noncapacitive impedances in the series circuits respectively to the gates for enabling each gate when a voltage pulse appears across the associated noncapacitive impedance;

a magnetic member coupled to the rotor for rotation therewith; and means for mounting the N saturable-core reactors at equal angular intervals around the rotor axis adjacent and in magnetically coupled relation to the magnetic member so that the member rotates past the reactors in sequence during each cycle of rotation of the rotor, the movement of the member past each reactor causing a gate-enabling voltage pulse to appear across the associated noncapacitive impedance of the series circuit.